Dec. 15, 1925.
L. J. LEON
BIRDCAGE
Filed Jan. 10, 1925
1,566,219
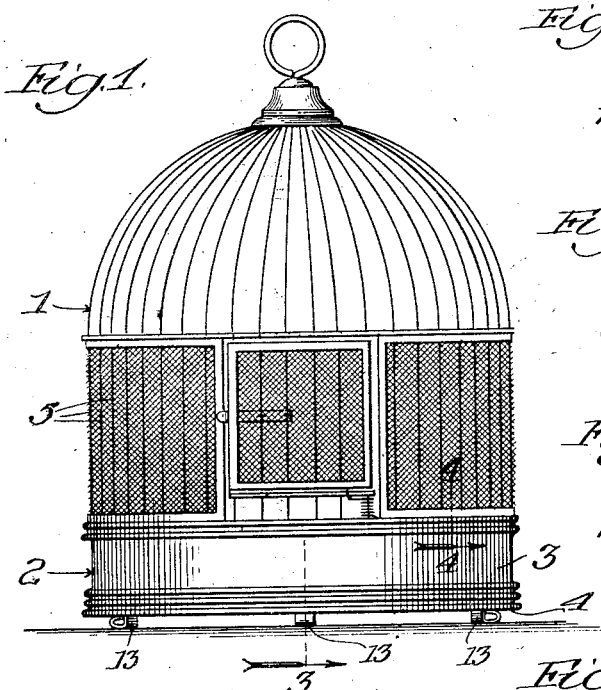
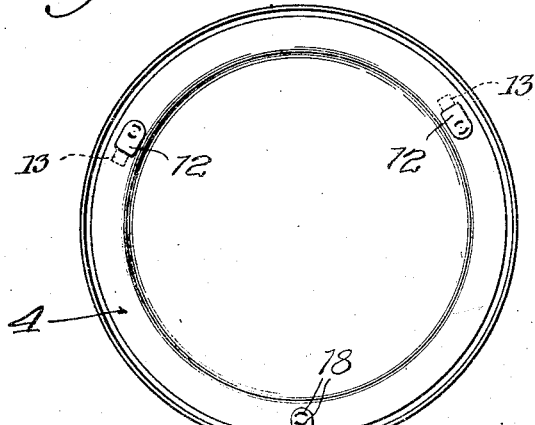
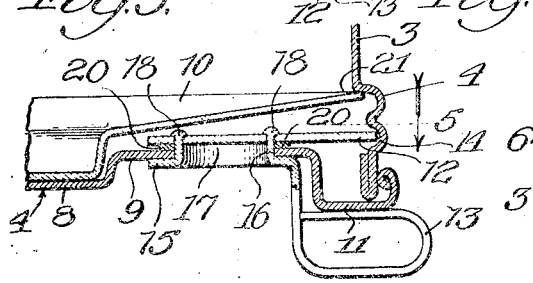
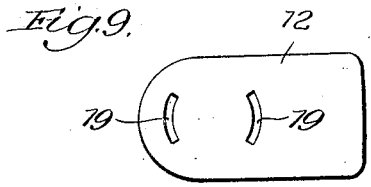
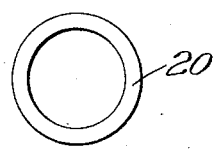
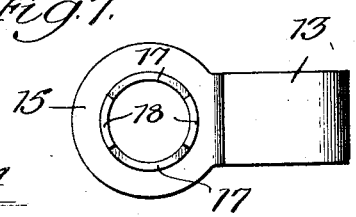
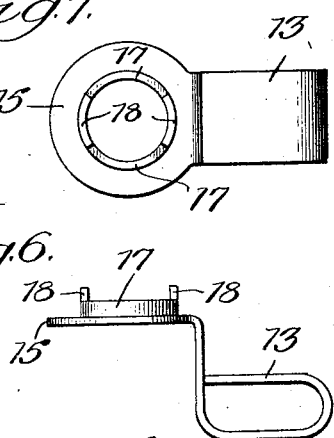
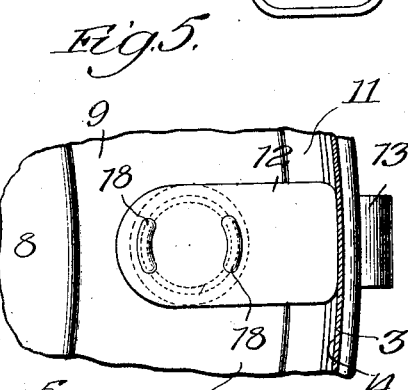
Inventor:
L. J. Leon,
By Eugene Evans
Atty.

Patented Dec. 15, 1925.

1,566,219

UNITED STATES PATENT OFFICE.

LEWICKI J. LEON, OF CHICAGO, ILLINOIS.

BIRDCAGE.

Application filed January 10, 1925. Serial No. 1,576.

*To all whom it may concern:*

Be it known that I, LEWICKI J. LEON, a citizen of the United States, residing at Chicago, in the county of Cook and State of Illinois, have invented new and useful Improvements in Birdcages, of which the following is a specification.

This invention relates to a latch construction particularly adapted for bird cages, and consists further in the matters hereinafter described and claimed.

In the accompanying drawings—

Fig. 1 is a view of a bird cage equipped with latch means of my invention;

Fig. 2 is a top plan view of the bottom wall of the cage removed therefrom;

Fig. 3 is an enlarged fragmentary vertical sectional view on line 3— of Fig. 1;

Fig. 4 is a vertical section on line 4—4 of Fig. 1;

Fig. 5 is a horizontal top plan view of the latch structure on line 5— of Fig. 3;

Fig. 6 is a side view of the operating member of the latch;

Fig. 7 is a top plan view of the same; and

Figs. 8 and 9 are top plan views of the washer and latch member, respectively.

As shown in Fig. 1, the cage comprises a body 1 and a base 2, both circular in form and with the top of the cage body dome shape, as shown. The base 2 has an upright marginal wall 3 and a bottom wall 4 detachably connected with said marginal wall by latch means of my invention.

The cage body 1 consists of spaced wires 5, 5 secured at their lower ends to a base member or ring 6, as shown in Fig. 4. Said ring 6 extends into a channel 7 formed around the upper edge of the marginal wall 3 for permanently connecting said wall to the cage body. This connection is solid, rigid and continuous around the cage body and enables the latter and base to be connected without the use of catches, as heretofore.

The bottom wall 4 is made from sheet metal (brass) stamped to have a flat center portion 8 offset below the immediately surrounding portion 9 to form a seat for a tray 10, as shown in Fig. 3. The tray is also made from sheet metal and so stamped to have a depressed center portion to fit in the depression or recess made in the bottom wall 4 to hold the tray against lateral shifting. The outer marginal portion 11 of the bottom wall 4 is offset considerably below the center portion 8 and forms a seat for the lower edge of the marginal wall 3, as shown in Fig. 3. The outer edge of the portion 11 is bent up to extend around the outside of the wall 3 and is turned over or beaded, as shown in Fig. 3.

The bottom wall 4 closes the base and is held in closed position by latch means, which as shown in the drawings are carried by and spaced about the bottom wall 4 and releasably engage the marginal wall 3 so that the bottom wall may be removed to take out the tray 10 or open the base for any other purpose whenever desired.

Each latch means comprises a latch member 12 on the inside of the wall 4 and an actuating member 13 on the outside of said wall, as shown in Fig. 3. These members are connected together through the wall portion 9 and on turning the outer member 13 the inner or latch member 12 is swung into and out of a channel 14 in the marginal wall 3 to connect and disconnect the bottom wall 4 to and from the marginal wall 3. The latch member 12 is preferably flat and has a straight front edge, as shown in Figs. 2 and 5, to hold the latch member from accidental turning when engaged with the wall 3 in the channel.

The outer members 13 of the latch means are below the bottom wall 4 and, in addition to being actuating members, serve as feet for the cage to elevate it above an underlying support, as shown in Fig. 1. When the latch members 12 are in locking position, the members 13 extend out beyond the base 2 from under the same, so that said members 13 may be readily grasped for turning when opening the base.

The members 12 and 13 of each latch means are connected as follows. The member 13 is formed to have a flat body portion 15, which fits up against the under side of the wall portion 9 about a hole 16 therein. Said body part has an upstanding annular flange 17, which extends upwardly through said hole 16 and forms a bearing for the member 13 against the edge of said hole as the member 13 is turned. The height of the flange 17 equals the gauge or thickness of the wall portion 9 and said flange has two upstanding, oppositely disposed tongues 18, 18, which extend upward through slots 19, 19 in the latch plate 12 to connect the latter to the member 13. The upper or outer ends of these tongues are upset over the plate 12, as shown in Fig. 3. A washer 20 is interposed between the plate 12 and the wall portion 9 to space the plate above the same and prevent scratching of said wall portion as the plate 12 is turned over the same.

Connecting the members 12 and 13 together in the manner shown and described provides wide bearing surfaces and allows for turning of the parts without binding, because there is no pinching of the parts together as encountered with ordinary riveting. Moreover, this construction allows the parts to be made from the light gauge material required for bird cages yet be strong enough for latch purposes.

In making the flange 17 and its tongues 18 a hole is made in the body portion 15. This hole is covered by the plate 12, as shown in Fig. 5, thus making it a neat job. The marginal wall 3 above the channel 14 is provided with an inwardly projecting annular stop 21 to limit the distance that the tray 10 may enter the base 2, as shown in Fig. 3. The bottom wall 4 holds the outer edge of the tray against this stop so that the tray is held firmly against movement in the cage when in use.

While I have shown and described herein my latch means as applied to bird cages, it may be used for other devices, and I do not wish to be limited to any particular application nor to any of the details shown and described as they may be variously changed and modified without departing from the spirit and scope of my invention.

I claim as my invention:

1. A base for bird cages, having a marginal wall and a separable bottom wall, latch members carried by the bottom wall on the inside thereof and adapted to be turned into and out of engagement with the marginal wall, and actuating members on the outside of the bottom wall and connected with the latch members for turning the same.

2. A base for bird cages, having a marginal wall and a separable bottom wall, latch members carried by the bottom wall on the inside thereof and adapted to be turned into and out of engagement with the marginal wall, and actuating members on the outside of the bottom wall and connected with said latch members for turning the same, said actuating members extending below the base to provide supports for the same.

3. A base for bird cages, having a marginal wall and a separable bottom wall, latch members carried by the bottom wall on the inside thereof and adapted to be turned into and out of engagement with the marginal wall, said latch members having straight end edges to engage the marginal wall for holding the latch members against accidental turning, and actuating members on the outside of the bottom wall and connected with the latch members for turning the same.

4. In a bird cage base, the combination with a marginal wall and a separable bottom wall, of latch means for releasably connecting said walls and comprising a latch member on the inside of the bottom wall, and an actuating member on the outside of said bottom wall, said members being connected together through the bottom wall by spaced tongues on one member extending through slots in the other member.

5. In a bird cage base, the combination with a marginal wall and a separable bottom wall, of latch means for releasably connecting said walls and comprising a latch member on the inside of the bottom wall, an actuating member on the outside of said bottom wall, said members being connected together through the bottom wall by spaced tongues on one member extending through slots in the other member, and means interposed between the latch member and the bottom wall to space the latch member out of contact with said bottom wall.

6. In a bird cage base, the combination with a marginal wall and a separable bottom wall, of latch means for releasably connecting said walls together and comprising a latch member inside of the bottom wall, an actuating member on the outside of said bottom wall and having an upstanding flange extending through a hole in the bottom wall beneath the latch member, said actuating member having oppositely disposed tongues extending upwardly from said flange and into slots in the latch member for connecting the latch and actuating members together.

7. A bird cage base, having a marginal wall and a separable bottom wall, said bottom wall having a depressed center portion and an outer marginal portion below the plane of the center portion, latch means for releasably connecting the marginal and bottom walls together and carried by the bottom wall in that portion thereof between the center portion and the outer marginal portion, said latch means having actuating members on the outside of the bottom wall and which members extend below the bottom wall to form supports for the base.

8. A cage, comprising a cage body and a base, said base having a marginal wall and a separable bottom wall with the marginal wall permanently connected with the cage body and extending below the same, said marginal wall having an inwardly extending shoulder above its lower end, said bottom wall having its outer marginal portion against the lower edge of the marginal wall and holding a tray on the bottom wall against said shoulder, and latch means for releasably connecting the bottom wall to the marginal wall.

9. A base for bird cages having an upright marginal wall and a separable bottom wall, and latch means carried by the bottom wall and engaging the marginal wall from the inside in a channel in said marginal wall for releasably connecting said walls together.

10. A base for bird cages having an upright marginal wall and a separable bottom wall, and latch means carried by the bottom wall and engaging the marginal wall from the inside in a channel in said marginal wall for releasably connecting said walls together, said latch means being operable from the under side of the bottom wall.

11. A base for bird cages having an upright marginal wall and a separable bottom wall, and latch means carried by the bottom wall and engaging the marginal wall on the inside for releasably connecting said walls together, said bottom wall having its marginal portion forming a seat for the lower edge of the upright wall and with the outer edge of said marginal portion extending upward on the outside of said upright wall.

In testimony that I claim the foregoing as my invention, I affix my signature, this 8th day of January, 1925.

LEWICKI J. LEON.